United States Patent
Tripp et al.

(10) Patent No.: US 9,298,597 B2
(45) Date of Patent: Mar. 29, 2016

(54) AUTOMATED TESTING OF WEBSITES BASED ON MODE

(71) Applicant: International Business Machines Corporation, Armonk, NY (US)

(72) Inventors: Omer Tripp, Bronx, NY (US); Avishai Vana, Netanya (IL)

(73) Assignee: International Business Machines Corporation, Armonk, NY (US)

(*) Notice: Subject to any disclaimer, the term of this patent is extended or adjusted under 35 U.S.C. 154(b) by 123 days.

(21) Appl. No.: 14/306,287

(22) Filed: Jun. 17, 2014

(65) Prior Publication Data

US 2015/0363298 A1 Dec. 17, 2015

(51) Int. Cl.
*G06F 11/00* (2006.01)
*G06F 11/36* (2006.01)
*G06F 17/30* (2006.01)
*H04L 12/26* (2006.01)

(52) U.S. Cl.
CPC ...... *G06F 11/3684* (2013.01); *G06F 17/30887* (2013.01); *H04L 43/10* (2013.01)

(58) Field of Classification Search
CPC ............ G06F 11/3668; G06F 11/3684; G06F 17/30887
See application file for complete search history.

(56) References Cited

U.S. PATENT DOCUMENTS

| | | | |
|---|---|---|---|
| 6,907,546 B1 * | 6/2005 | Haswell | G06F 11/3684 714/38.11 |
| 7,069,541 B2 | 6/2006 | Dougherty et al. | |
| 7,444,548 B2 | 10/2008 | Shane | |
| 7,496,645 B2 | 2/2009 | Yeung et al. | |
| 7,908,590 B1 * | 3/2011 | Min | G06F 11/3684 717/124 |
| 8,365,140 B2 | 1/2013 | Heyhoe et al. | |
| 2003/0078959 A1 * | 4/2003 | Yeung | G06F 8/62 709/201 |

FOREIGN PATENT DOCUMENTS

WO 2008060722 A2 5/2008

OTHER PUBLICATIONS

Beaver, Kevin; "Should you Test Development, Staging or Production?"; Sep. 6, 2012; <http://www.acunetix.com/blog/articles/should-you-test-development-staging-or-production>.*

Beaver, Kevin; "Should you Test Development, Staging or Production?"; Sep. 6, 2012; Printed Mar. 23, 2014; <http://www.acunetix.com/blog/web-security-zone/should-you-test-devel . . . >.

"Continuous Testing of Production Web Applications"; CENZIC Securing Enterprise Applications; Whitepaper; Copyright 2007 Cenzic, Inc.

IBM; "Automated on Demand Deployment of Web Applications Assets"; IP.com Prior Art Database Technical Disclosure; Publication Date: Sep. 6, 2006; IPCOM000140345D.

(Continued)

*Primary Examiner* — Joshua P Lottich
(74) *Attorney, Agent, or Firm* — Jason H. Sosa

(57) ABSTRACT

Examples of techniques for testing websites are described herein. In one example, a method for testing a website includes receiving, via a processor, a website address of the website to be tested. The method can include determining, via the processor, whether the website is in a staging mode or a production mode. The method can also include configuring, via the processor, a testing application to test the website according to the determined mode.

20 Claims, 6 Drawing Sheets

(56) References Cited

OTHER PUBLICATIONS

"Tip/Trick: Automating Dev, QA, Staging, and Production Web. Config Settings with VS 2005"; ScottGu's Blog; <weblogs.asp.net/scottgu/archive/2007/09/21/tip-trick-automating-dev-qa-staging-and-production-web-config-settings-with-vs-2005.aspx>.

Weber, Chris; "Watcher: Web security testing tool and passive vulnerability scanner"; Copyright 2006-2014 Microsoft; <http://websecritytool.codeplex.com/documentation>.

Winslow, Dana; "Why You Need a Local Testing Server (and How to Do It)"; Copyright 2003-2014 DWUser.com/Magnetic Marking Corp.; Printed Mar. 23, 2014; <http://www.dwuser.com/education/content/why-you-need-a-testing-serve . . . >.

* cited by examiner

AUTOMATED TESTING OF WEBSITES BASED ON MODE

BACKGROUND OF THE INVENTION

The present invention relates to automated testing of websites, and more specifically, to an automated method of testing web sites based on whether the websites are running in staging or production web deployment modes.

SUMMARY

According to an embodiment described herein, a method for testing a web site can include receiving, via a processor, a website address of the website to be tested. The method can also include determining, via the processor, whether the website is in a staging mode or a production mode. Furthermore, the method can include configuring, via the processor, a testing application to test the website according to the determined mode.

According to another embodiment described herein, a system can include a processor and a storage device comprising processor executable instructions. In some examples, the instructions when executed by the processor, cause the computing system to receive a website address of the website to be tested. The processor can also determine whether the website is in a staging mode or a production mode. Furthermore, the processor can configure a testing application to test the website according to the determined mode.

According to another embodiment described herein, a computer program product can test a website. The computer program product includes a computer readable storage medium having program code embodied therewith, the program code executable by a processing circuit to perform a method including receiving, via the processing circuit, a website address of the website to be tested. The method includes determining, via the processing circuit, whether a website to be tested is running in a staging mode or a production mode. Furthermore, the method includes configuring, via the processing circuit, a testing application based on the determined mode.

DETAILED DESCRIPTION

Figure 1:
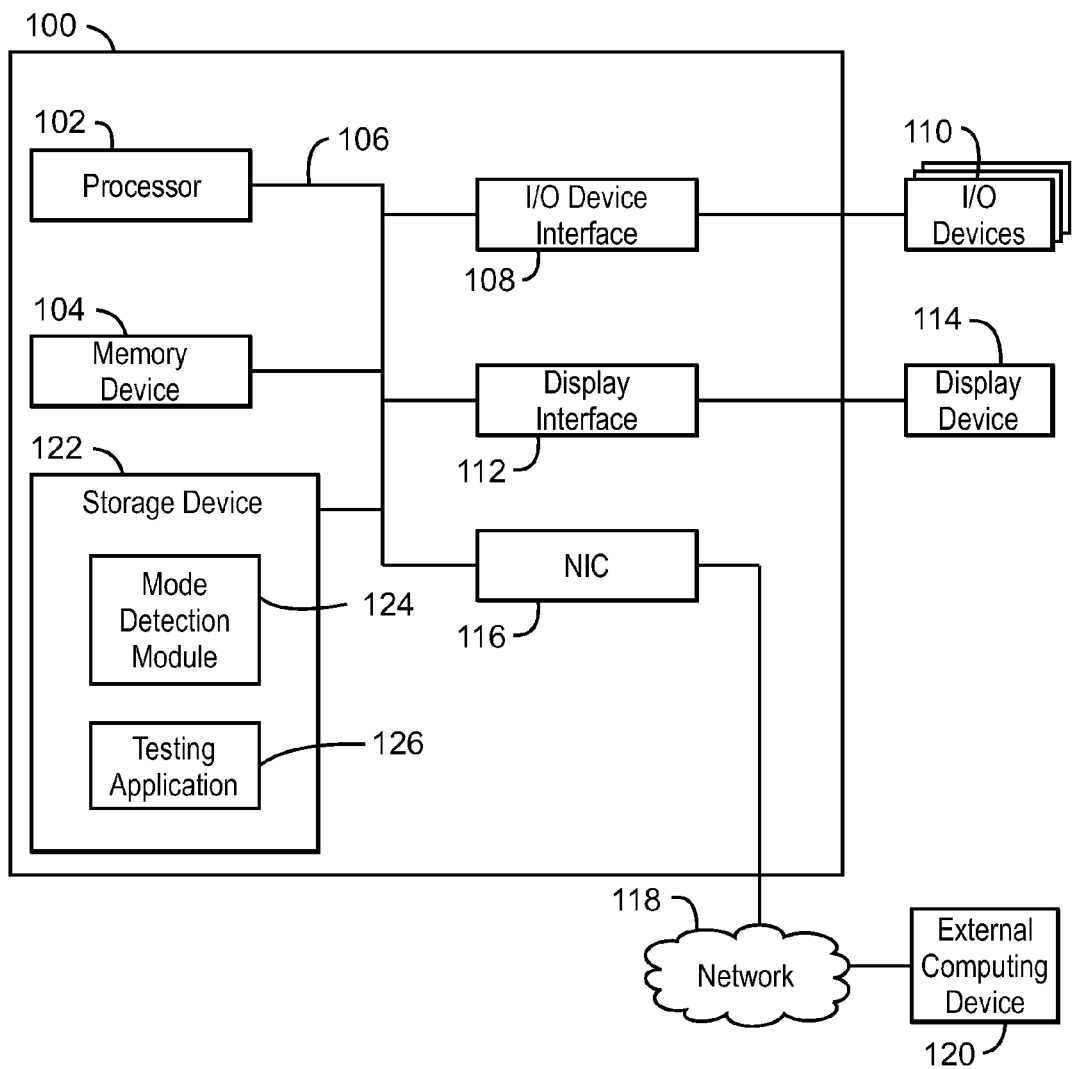
FIG. 1 is block diagram of an example computing device that can automate testing of websites based on mode of operation.

According to embodiments of the present disclosure, a computing device can test a website based on whether the website is running in a staging mode or a production web deployment mode (herein "production mode"). A staging mode, as referred to herein, is the operation of a website in a testing environment in which the website is not available publicly to users. A production mode, as referred to herein, is the operation of a website wherein a website is publicly available to users. In the staging mode, the operation of the website may not fully represent the behavior, data, or functionality of the production site. In the production mode, the operation of the website may not allow for intrusive testing to the level and depth of testing in the staging mode. In some examples, an external computing device can detect whether the website is running in a staging mode or a production web deployment mode. The external computing device may send the detected mode to a mode detection module of the system to configure a testing application accordingly.

In some scenarios, the techniques described herein may be implemented in a cloud computing environment. As discussed in more detail below in reference to at least FIGS. 1, 5, and 6, a computing device configured to detect a mode of operation of a given website may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

With reference now to FIG. 1, an example computing device can test websites based on mode of operation. The computing device 100 may be, for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is capable of executing stored instructions, a memory device 104 to provide temporary memory space for operations of said instructions during operation. The processor can be a single-core processor, multi-core processor, computing cluster, or any number of other configurations. The memory device 104 can include random access memory (RAM), read only memory, flash memory, or any other suitable memory systems. The instructions executed by the processor 102 may be used to implement a method that can monitor transmitted data.

The processor 102 may be connected through a system interconnect 106 (e.g., PCI®, PCI-Express®, etc.) to an input/output (I/O) device interface 108 configured to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100 or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. An external computing device 120 may connect to the computing device 100 through the network 118. In some examples, external computing device 120 may be an external webserver 120.

The processor 102 may also be linked through the system interconnect 106 to a storage device 122 that can include a hard drive, an optical drive, a USB flash drive, an array of drives, or any combinations thereof. In some examples, the storage device 122 can include a mode detection module 124 and testing application 126.

In some embodiments, a mode detection module 124 can communicate with external computing device 120 to determine if a website is in a staging or production mode. For example, mode detection module 124 may receive a message from external webserver 120 that a website is running in production mode. In some embodiments, the mode detection module 124 may send the mode information to a testing application 126. Testing application 126 can have testing configured according to the mode detected by the mode detection module 124.

In embodiments, the testing application 126 can test a website based upon its mode. In some examples, the testing application 126 may send a uniform resource locator (URL) to mode detection module 124 which in turn sends the URL to external webserver 120. External webserver 120 may then determine whether a website at the URL is running in a staging or production mode. For examples, external webserver 120 may determine the mode by pinging the URL and monitoring for a response as described in greater detail below, in reference to FIG. 2 and FIG. 3. The external webserver 120 may then return the mode of operation at the URL to mode detection module 124. The testing application 126 may then receive the mode of operation and configure testing based on the mode of operation received.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, additional modules, additional network interfaces, etc.). Furthermore, any of the functionalities of the mode detection module 124 and testing application 126 may be partially, or entirely, implemented in hardware and/or in the processor 102. For example, the functionality may be implemented with an application specific integrated circuit, or in logic implemented in the processor 102, among others.

Figure 2:
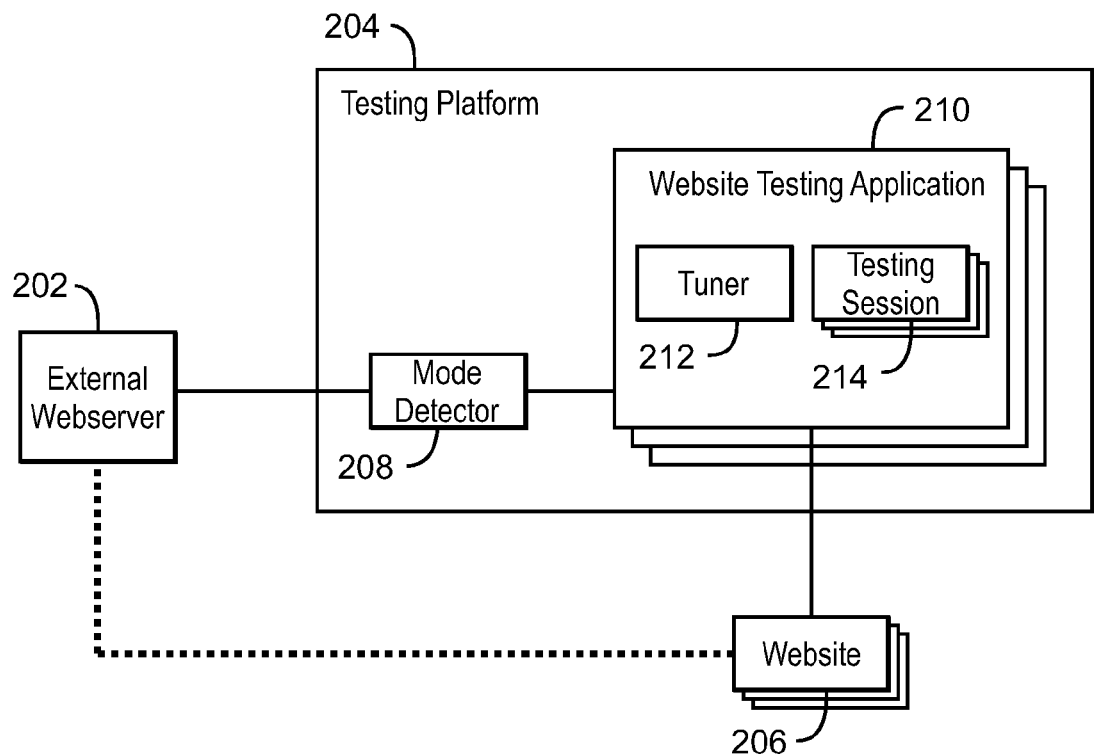
FIG. 2 is a block diagram of a system that can automate testing of websites based on mode of operation.

FIG. 2 is a block diagram of an example system that can automate testing of websites based on mode of operation. In some embodiments, the system 200 can include an external webserver 202, a testing platform 204, and at least one website 206. The external webserver 202 can attempt to communicate with at least one website 206 to determine whether it is running in a staging or production mode. The external webserver 202 can transfer the mode information to a testing platform 204 by any suitable protocol.

In some embodiments, the testing platform 204 can include a mode detector 208 and at least one website testing application 210. In some examples, there may be one instance of the website testing application 210 for each website 206 to be tested. The mode detector 208 may receive operation mode data from external webserver 202 and forward the data to the website testing application 210. In some embodiments, the mode detector 208 may receive mode data from any suitable number of external webservers 202. For example, multiple external webservers 202 may receive URLs to determine the mode of a website 206. In some examples, the external webserver 202 may then ping the URL. For example, the external webserver 202 may send echo request packets to a given URL. If no response is received by any of the external webservers 202 for the given URL echo requests sent, then a staging mode may be determined, as discussed in more detail below in reference to FIG. 3.

In some embodiments, the website testing application 210 can include a tuner 212 and testing session 214 to perform testing on website 206. For example, the website testing application 210 can use the tuner 212 to configure testing session 214 appropriately based on the mode of operation of website 206. In some examples, tuner 212 may receive production mode data from mode detector 208 and filter out tests that are not to be performed in a production mode testing session 214. For example, if website 206 is running in a production mode, then tests that would be deemed inappropriate for a production environment would be filtered out by tuner 212 from the corresponding testing session 214 to be run on that publicly available production mode website 206. For example, in security testing, test payloads are fired at the website 206. However, when operating in production mode, certain tests can potentially mutate the persistent state of website 206 as well as cause unintended behaviors such as crashes, deadlocks, and livelocks. The persistent state of the website 206 may include backend databases, its file system, among other file structures. Tuner 212 may, therefore, prevent test payloads capable of potentially mutating the persistent state from being used on the website 206 during production mode. For example, tuner 212 may exclude tests on CRUD (Create, Read, Update, Delete) operations that may alter site information (including the Create, Update, or Delete operations) from a testing session 214 to be run on a website 206 running in production mode.

In performance testing, certain tests can cause the website 206, or an application associated with the website 206, to become slow and unresponsive and may even lead to crashes. In some scenarios, the tuner 212 may prevent performance tests that are too burdensome from being executed on a website 206 determined to be in production mode. For example, the tuner 212 may limit the number of threads to be used on a testing session 214 for a production mode website 206. In this manner, the tuner 212 may limit the number of tests that would be sent per second to the website 206 when in production mode. In some examples, tuner 212 may also exclude denial of service (DoS) tests from a testing session 214 to be run on a production mode website 206.

In integrity testing, which may include verifying that response HTML pages of websites 206 are intact and abide by the HTML specification for example, certain tests may lead to unresponsiveness as well as crashes. Therefore, in some examples, tuner 212 may also prevent such integrity tests from running on the website 206 when in production mode. Testing of login sequences may also lock accounts. Therefore, in some examples, tuner 212 may also prevent tests on login sequences.

In some examples, the website 206 may be running in a staging mode. A website 206 running in staging mode may have additional tests or all tests included by tuner 212 in its testing session 214. In some embodiments, the tuner 212 may analyze tests to be run in testing session 214 as they are added to website testing application 210. For example, tests may be added or updated through updates to the website testing application 210. In some examples, tuner 212 may analyze tests on a test-by-test basis at runtime of the website testing application 210.

By automating the testing of websites based on mode detection of a given website to be tested, embodiments of the techniques described herein reduce the rate of error that may occur in manual configurations of testing by administrators due to human error. For example, an administrator might mistakenly run a staging mode test on a production mode website and cause it to crash. Thus, consistency is introduced through automation. The time required for an administrator to specify different configurations for testing may also be saved while allowing for the most intrusive, yet also safe, testing session to be performed. Moreover, response time to new threats in, for example, security testing may also be reduced.

Figure 3:
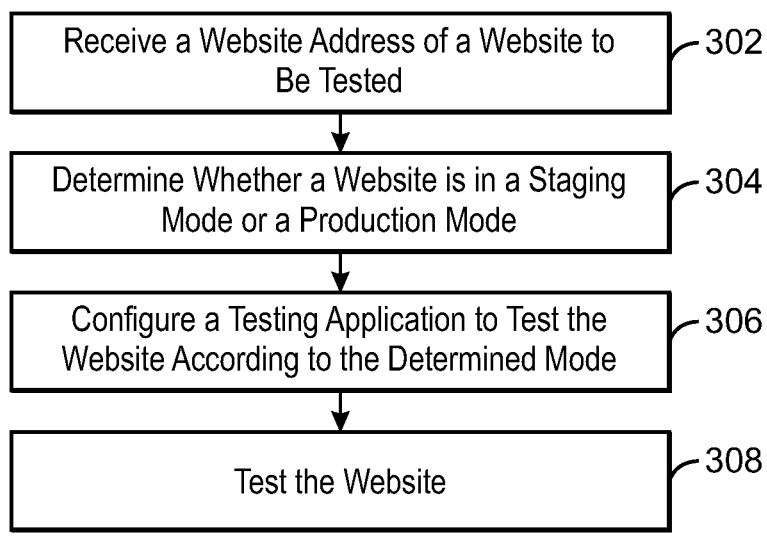
FIG. 3 is a process flow diagram of an example method that can test websites based on mode of operation.

FIG. 3 is a process flow diagram of an example method that can test websites based on mode of operation. The method 300 can be implemented with any suitable computing device, such as the computing device 100 of FIG. 1.

At block 302, an external webserver 120, 202 can receive a website address of a website 206 to be tested. As discussed above, the website address may be in the form of a URL address. In some examples, webserver 120, 202 may receive website addresses for each website 206 to be tested. In some examples, the webserver 120, 202 may receive the website addresses from a mode detector 208 of the testing platform 204.

At block 304, an external webserver 120, 202 can determine whether a website is in a staging mode or a production mode. In some examples, external webserver 120, 202 may determine whether a website 206 is running in production mode by sending a request to the website 206 using the URL address. For example, the external webserver 120, 202 may send echo request packets using the Internet Control Message Protocol (ICMP) to website 206 to determine if it is operating in production mode. If the external webserver 120, 202 receives no echo response to the ping, then external webserver 120, 202 returns a no response message to mode detector 208. If external webserver 120, 202 receives an echo response to its echo request packets, then external webserver 120, 202 returns a successful response message to mode detector 208. In some examples, mode detector 208 may send an URL to multiple external webservers 120, 202 to increase reliability of detection. For example, mode detector 208 may send an URL to three external webservers 120, 202 and only receive successful response messages from one or two of the external webservers 120, 202. In some examples, the mode detector 208 may treat a successful response from at least one server as a detected production mode and send a production mode indication for the respective URL to tuner 212.

At block 306, the tuner 212 can configure the testing application 126, 210 to test the website 206 according to the determined mode. In some embodiments, tuner 212 may create an appropriate testing session based on the mode of website 206 detected by the mode detector 208 and external webserver 120. For example, tuner 212 may receive a message from external webserver 120, 202 that website 206 is operating in a production mode. In some examples, tuner 212 may then prevent unsuitable tests from being run in testing session 214 for website 206. In some examples, tuner 212 may exclude tests that are overly intrusive for a production environment. In some embodiments, configuring the testing application can include mode-specific test preparation options prior to determining the mode of the website. For example, the tuner 212 may configure testing application 126, 210 by creating a testing session option to be run in production mode and a testing session option to be run in a staging mode before the external webserver 120 determines the mode of the website 206. The website testing application 210 may then use the corresponding testing session of the mode detected by mode detector 208 when website 206 is to be tested.

At block 308, a testing application 126, 210 can test the website 206. In some embodiments, website testing application 210 can create a testing session 214 for each website 206 to be tested. In some examples, the tuner 212 may continue tuning testing session 214 while it is running. For example, a new test may have been added to run, or a test may be determined to be inappropriate by the tuner 212 for the particular website 206.

The process flow diagram of FIG. 3 is not intended to indicate that the operations of the method 300 are to be executed in any particular order or that all of the operations of the method 300 are to be included in every case. For example, the tuning of testing session 214 may occur before the external webserver 202 determines the mode of website 206. In some examples, the tuning of testing session 214 may occur after external webserver 202 determines the mode of website 206 but before testing session 214 is run on website 206. In some examples, tuning of testing session 214 may occur after testing session 214 has already been executed, and the testing session 214 may be tuned during runtime. Additionally, the method 300 can include any suitable number of additional operations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Ruby, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
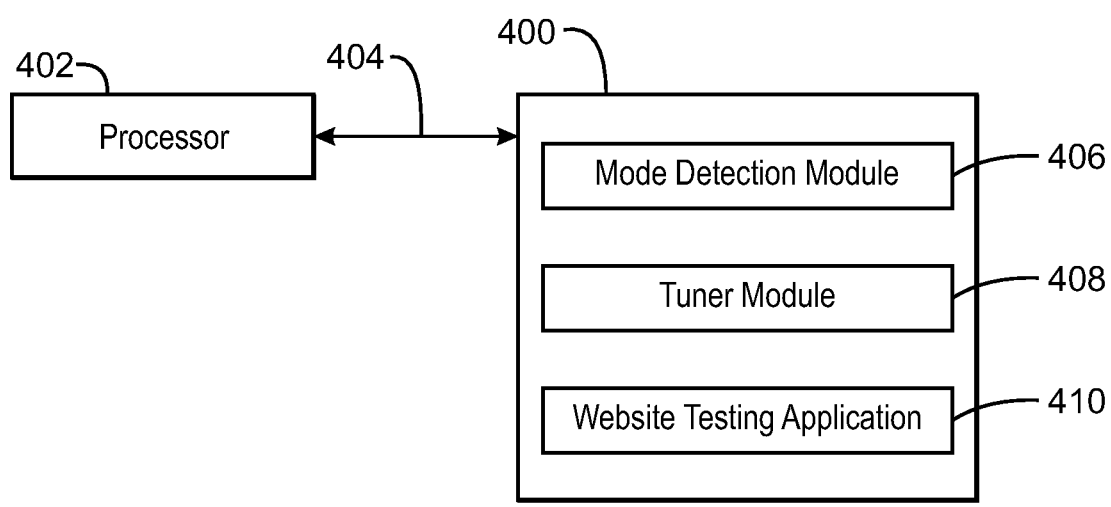
FIG. 4 is a computer readable storage medium that can test websites based on mode of operation.

Referring now to FIG. 4, a block diagram is depicted of an example of a computer readable storage medium that can test websites based on mode of operation. The computer readable storage medium 400 may be accessed by a processor 402 over a computer interconnect 404. Furthermore, the computer readable storage medium 400 may include code to direct the processor 402 to perform the operations of the current method.

The various software components discussed herein may be stored on the computer readable storage medium 400, as indicated in FIG. 4. For example, a mode detection module 406 may detect the mode of operation of a website to be tested. In some embodiments, a tuner module 408 can create website testing application 410 based on the mode of operation detected by mode detection module 406. In some examples, the website testing application 410 can be tuned on a test-by-test basis in real-time. It is to be understood that any number of additional software components not shown in FIG. 4 may be included within the computer readable storage medium 400, depending on the specific application.

Figure 5:
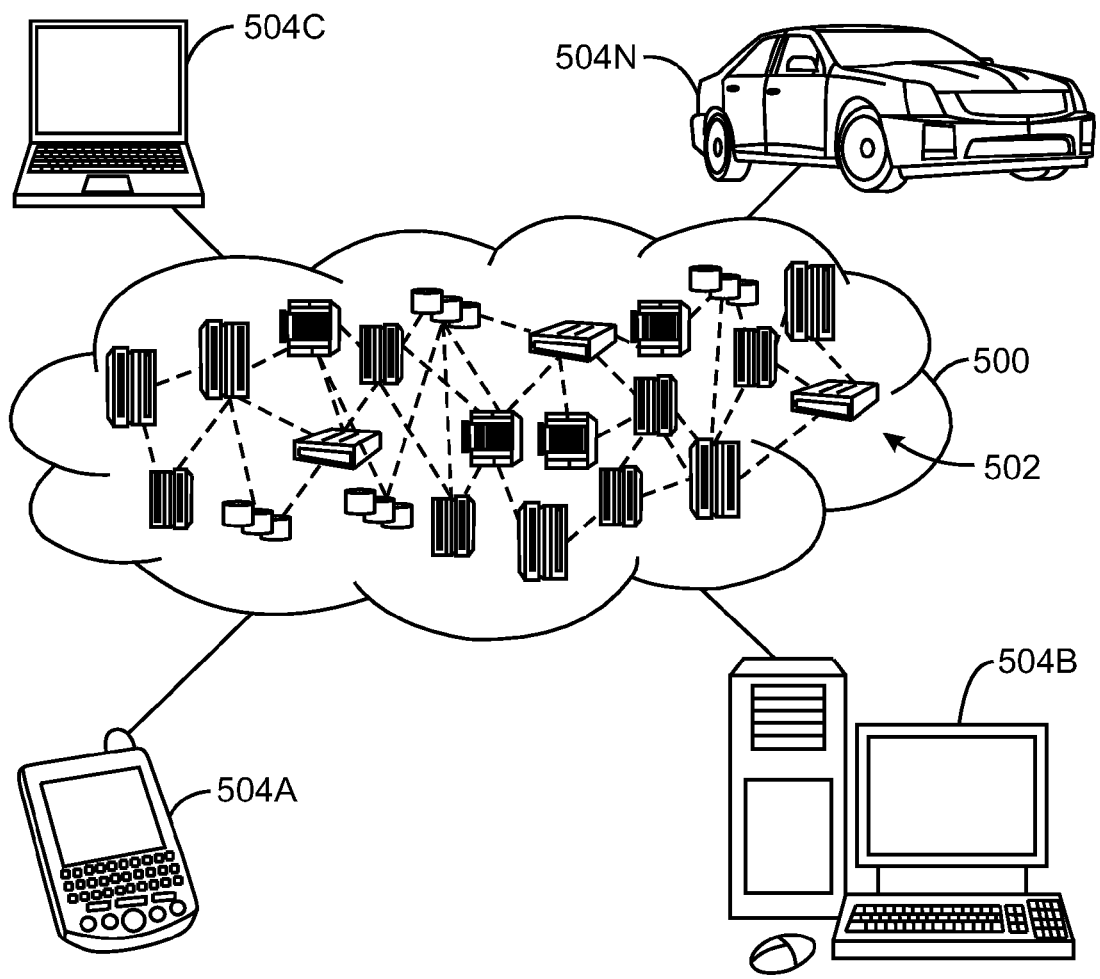
FIG. 5 depicts a cloud computing environment according to an embodiment of the present disclosure.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms, and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
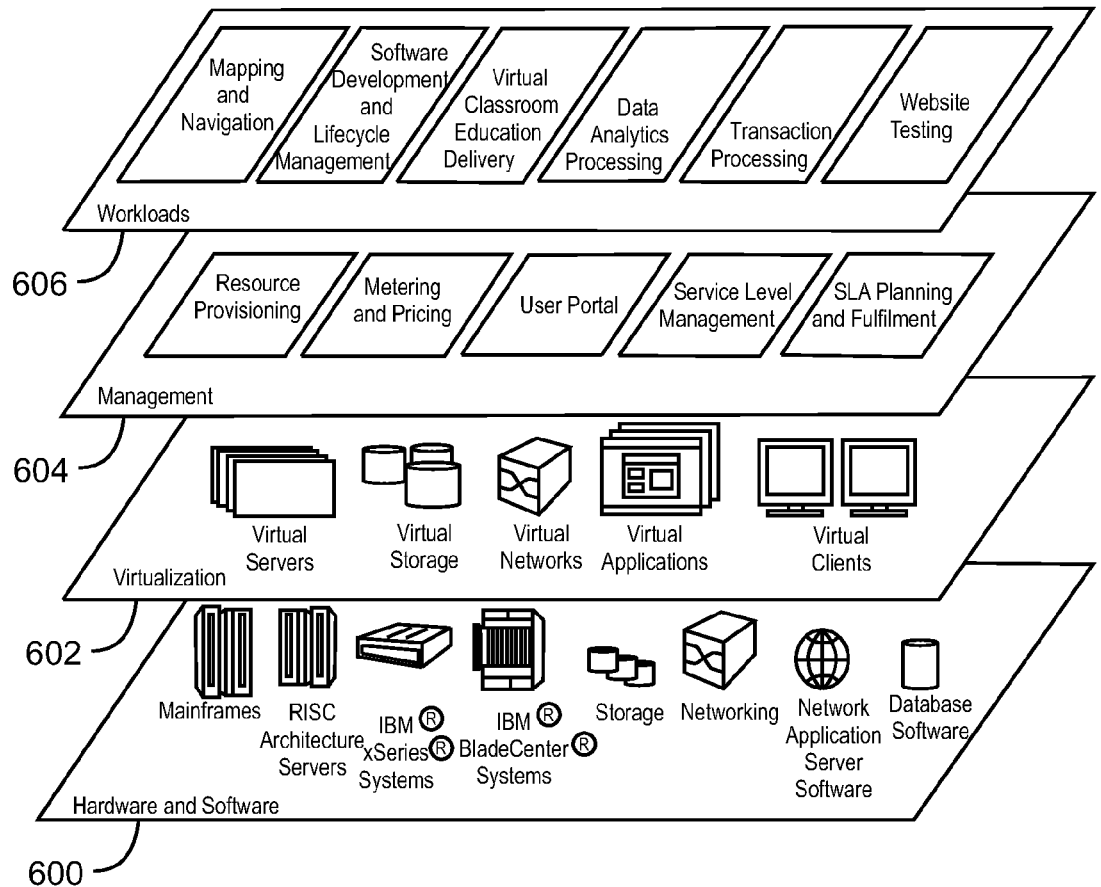
FIG. 6 depicts abstraction model layers according to an embodiment of the present disclosure.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and pricing provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and website testing.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for testing a website, comprising:
   receiving, by one or more computer processors, a website address of the website to be tested;
   determining, by one or more computer processors, whether the website is in a staging mode or a production mode; and
   configuring, by one or more computer processors, a testing application to test the website according to the determined mode.

2. The method of claim 1, wherein determining whether the website is in a staging mode or a production mode comprises:
   pinging an URL of the website via an external webserver;
   determining, by one or more computer processors, whether a response to the ping is received; and
   if a response to the ping is not received, determining, by one or more computer processors, the website to be in a staging mode.

3. The method of claim 1, wherein configuring the testing application further comprises preparing mode-specific test preparation options prior to determining the mode of the website.

4. The method of claim 1, wherein configuring the testing application is performed on a real-time basis as the testing application is testing the website.

5. The method of claim 1, wherein configuring the testing application is performed after determining the mode but before the testing application tests the website.

6. The method of claim 1, wherein determining the mode of the website and configuring the testing application is executed automatically in response to an attempt to run the testing application.

7. The method of claim 1, wherein the testing application is configured to not run a subset of tests if the website is in a production mode.

8. A computing system, comprising:
   one or more computer processors;
   one or more computer readable storage media; and
   program instructions, stored on at least one of the one or more computer readable storage media and executable by at least one of the one or more computer processors, the program instructions comprising:
   program instructions to receive a website address of the website to be tested;
   program instructions to determine whether the website is in a staging mode or a production mode; and
   program instructions to configure a testing application to test the website according to the determined mode.

9. The computing system of claim 8, wherein the program instructions to determine whether the website is in a staging mode or a production mode comprises program instructions to:
   ping a URL of the website;
   determine whether a response to the ping is received; and
   if a response is received, determine the website to be in a production mode.

10. The computing system of claim 8, wherein the program instructions to configure the testing application comprise program instructions to prepare mode-specific test preparation options prior to determining the mode of the website.

11. The computing system of claim 8, wherein the program instructions to configure the testing application execute subsequent to determining the mode of the website, but before running the testing application.

12. The computing system of claim 8, wherein the program instructions to configure the testing application configure the testing application according to the mode of the website on a test-by-test basis.

13. The computing system of claim 8, wherein the program instructions to configure the testing application configure the testing application in response to an attempt to run the testing application.

14. The computing system of claim 8, wherein the testing application is configured to operate as a Software as a Service (SaaS).

15. A computer program product for testing a website, the computer program product comprising:
   one or more computer readable storage media and program instructions stored on the one or more computer readable storage media, the program instructions comprising:
   program instructions to receive a website address of the website to be tested;
   program instructions to determine whether the website is in a staging mode or a production mode; and
   program instructions to configure a testing application to test the website according to the determined mode.

16. The computer program product of claim 15, wherein the program instructions to determine whether the website is in a staging mode or a production mode comprises program instructions to:
   ping a URL of the website;
   determine whether a response to the ping is received; and
   if a response is received, determine the website to be in a production mode.

17. The computer program product of claim 15, wherein the program instructions to configure the testing application comprise program instructions to prepare mode-specific test preparation options prior to determining the mode of the website.

18. The computer program product of claim 15, wherein the program instructions to configure the testing application execute subsequent to determining the mode of the website, but before running the testing application.

19. The computer program product of claim 15, wherein the program instructions to configure the testing application execute subsequent to determining the mode of the website but before the testing application begins testing.

20. The computer program product of claim 15, wherein the program instructions to configure the testing application configure the testing application in response to an attempt to run the testing application.

* * * * *